3,469,776
PIN CARRIAGE FOR CALCULATORS
Alfred Hesse, Heinz Focken, and Wolfgang Bindel, Wilhelmshaven, Germany, assignors to Olympia Werke A.G., Wilhelmshaven, Germany
Filed Feb. 15, 1967, Ser. No. 616,267
Claims priority, application Germany, Feb. 16, 1966, O 11,450
Int. Cl. G06c 29/00; G06k 7/04
U.S. Cl. 235—60   16 Claims

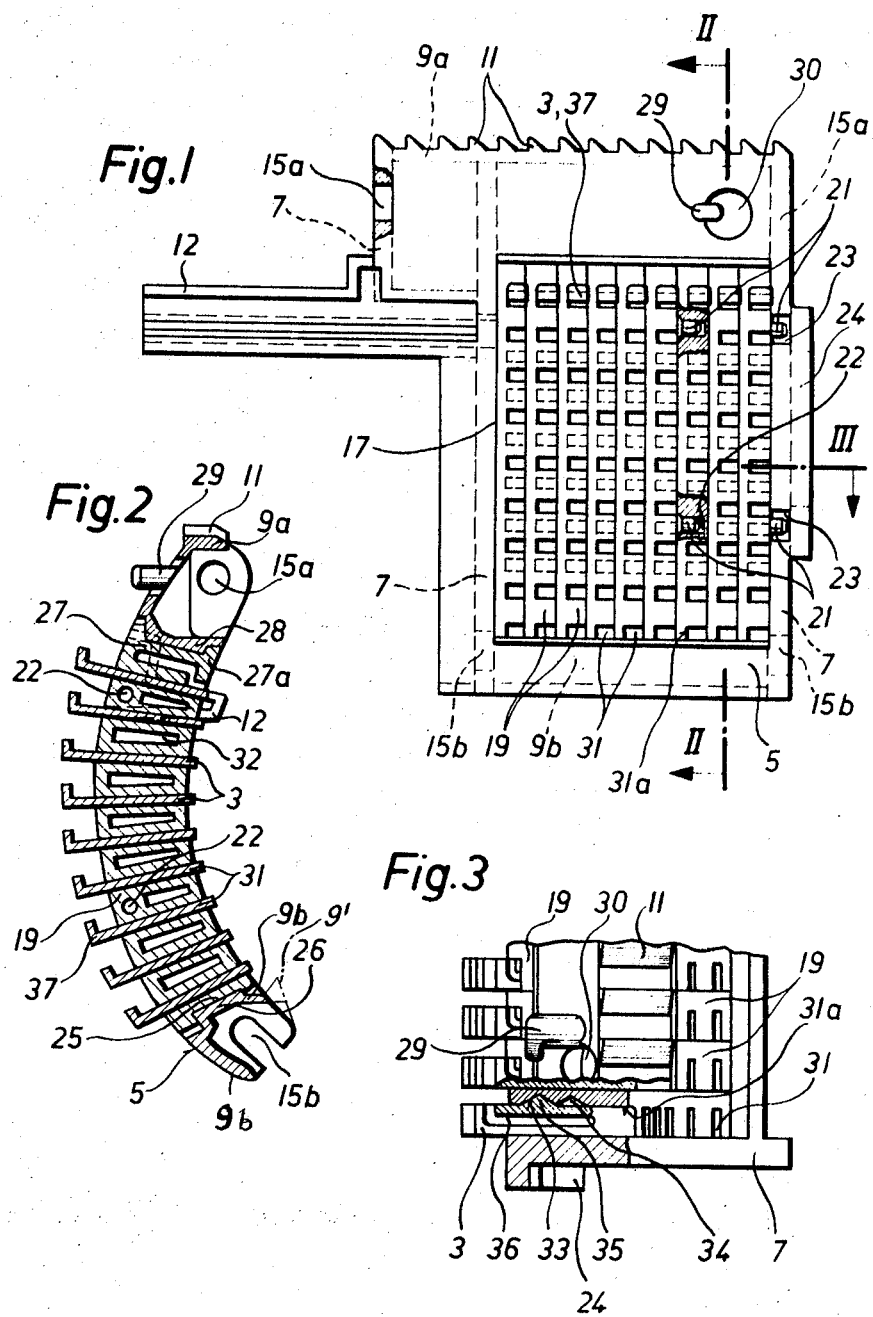

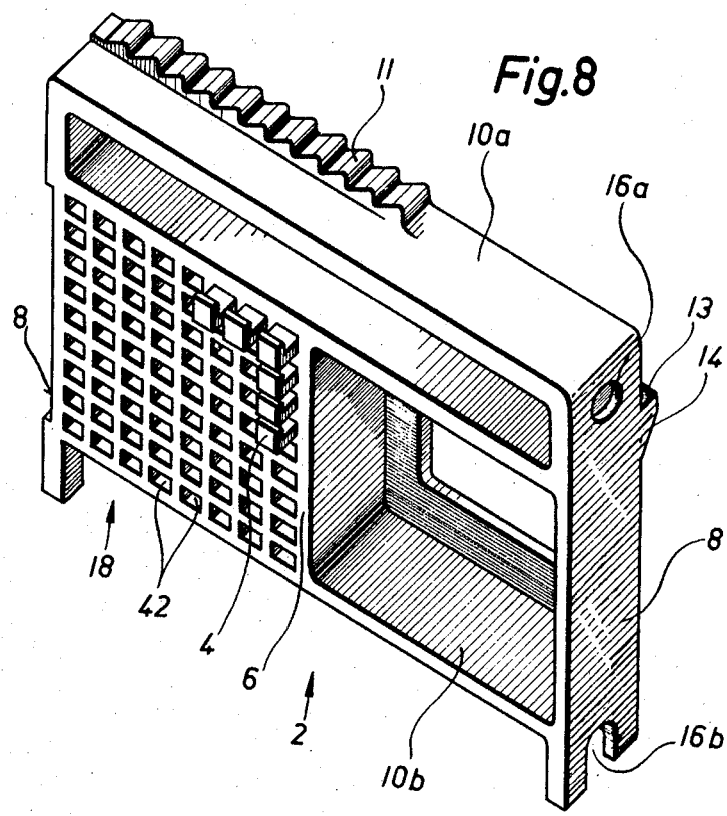

ABSTRACT OF THE DISCLOSURE

The pin carriage of a calculator is made entirely of a synthetic plastic material and has an integral homogeneous frame body in which a stack consisting of a selected number of ordinal holding elements, consisting of the plastic material and having cutouts for pins, is detachably mounted.

BACKGROUND OF THE INVENTION

The present invention relates to pin carriages used in calculators as at storage between a ten key keyboard and differential actuators which sense values stored in the pin carriage and transfer the same to a register of the calculator.

Pin carriages of the type with which the present invention is concerned have stop pins arranged in columns and lines to form a matrix in which the columns are associated with denominational orders, and the lines with nine digits, an abutment being provided for the tenth digit.

A pin carriage disclosed in the German Patent No. 586,763 discloses rails for supporting the stop pins. Locking springs are slidably arranged at the ends of the rails extending parallel to the pins. The pin carriage runs on guide rails by means of rollers, and one of the guide rails has a longitudinal groove in which a rack bar is secured.

This pin carriage permits arrangement of the stop pins at a distance of only 2.6 mm., and reliable mounting of the arresting springs, but the pin carriage requires a great many parts which are expensive to manufacture and assemble. Also, this pin carriage has a substantial mass and great inertia.

Another pin carriage is disclosed in the German Patent No. 863,853 and has two lateral guide members in which holding elements for the stop pins associated with the same digits are guided, and with which the holding elements are connected by welding their end portion 5. This pin carriage consists of metal and has great inertia. The welding of the small parts causes distortions and inner tensions in the metal parts.

The U.S. Patent No. 3,095,143 discloses a pin carriage having an integral arcuate body comprising a plurality of parallel bars having openings for the stop pins. The ends of the parallel bars fit into corresponding openings of a curved frame which consists of metal, whereas the arcuate body is made of a synthetic plastic material. This pin carriage consists of fewer parts, and is more easily assembled than other known pin carriages, but since the frame is made of metal, and the arcuate pin supporting body is made of a synthetic material, two different manufacturing processes, and generally two different workshops with differently trained personnel are required. The construction is not particularly strong and permits deformations which may influence the movability of the stop pins. The metal frame has to be constructed of a great number of parts.

SUMMARY OF THE INVENTION

It is one object of the invention to provide a pin carriage which consists entirely of a synthetic plastic material.

Another object of the invention is to provide a pin carriage of simple construction which can be inexpensively made and assembled.

Another object of the invention is to provide a pin carriage having an integral homogeneous body consisting of a synthetic plastic material detachably supporting a stack of a selected number of ordinal pin holding elements consisting of a plastic material.

With these objects in view, a pin carriage according to one embodiment of the invention has an integral homogeneous frame body consisting entirely of a synthetic plastic material and comprising a front portion adapted for receiving stop pins, lateral and longitudinal portions bounding the front portion, a rack portion on one of the longitudinal portions, and a zero abutment.

The frame body can be manufactured by an injection molding process or the like. Due to the fact that the frame body is an integral part, the many small parts of prior art constructions can be avoided. Due to this fact, the storage, the obtaining of spare parts, and the service of calculators having the pin carriage of the invention, are facilitated. The pin carriage has a comparatively small mass which is favorable for the construction of the drive means for the pin carriage. In the preferred embodiment of the invention the lateral portions have open recesses mounted on guide rails. The rack bar can be disposed on the outside of a longitudinal portion and may have forwardly or upwardly directed teeth. In one embodiment of the invention, the front portion is arcuate and convex to the outside which is suitable for use of the pin carriage with differential denomination actuators which are mounted for turning movement about an axis.

In the preferred embodiment of the invention the front portion has a rectangular aperture in which parallel holding elements are detachably mounted. This has the advantage that the number of the lamellae-like holding elements can be selected in accordance with the number of denominational orders for which the calculator is designed, each holding element being associated with one denominational order and having nine openings or cutouts for receiving digital stop pins. The holding elements are attached to each other by pin and socket connections, and together inserted into the aperture of the front portion. The connector pins of the last holding elements are received in open recesses in a lateral portion of the frame body. Preferably, the openings for the stop pins are open recesses or cutouts closed by the respective adjacent holding element.

Arresting means are provided for arresting each stop pin in two positions corresponding to an inoperative condition, and to an operative set condition of the stop pins.

In another embodiment of the invention, a front portion is a planar plate formed with columns and lines of openings in which the stop pins are received.

In both embodiments, the frame body has an integral abutment for stopping the actuators in the position corresponding to the digit nine.

One surface of each opening has a projection cooperating with a resilient tongue of the respective stop pin for arresting the same.

The end portion of each stop pin by which the respective actuator member is stopped, is preferably reduced, and the resilient tongue projects obliquely from the base of the reduced portion.

This construction of the stop pins facilitates the calculating operation "repetition over a sum" if the pin carriage is shifted half a pitch relative to the actuators which sense the set stop pins.

The actuators which sense the value stored in the pin carriage by the stop pins, pass between two rows of stop pins, and the reduced end portions of the stop pins provide sufficient space for the actuators between two adjacent rows of stop pins.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a front view of one embodiment of the invention;

FIG. 2 is a sectional view taken on line II—II in FIG. 1;

FIG. 3 is a fragmentary sectional view taken on line III—III in FIG. 1;

FIG. 8 is a perspective view of the embodiment of FIGS. 5 to 7.

DESCRIPTION OF THE PREFERRED EMBODIMENT

Figure 4:
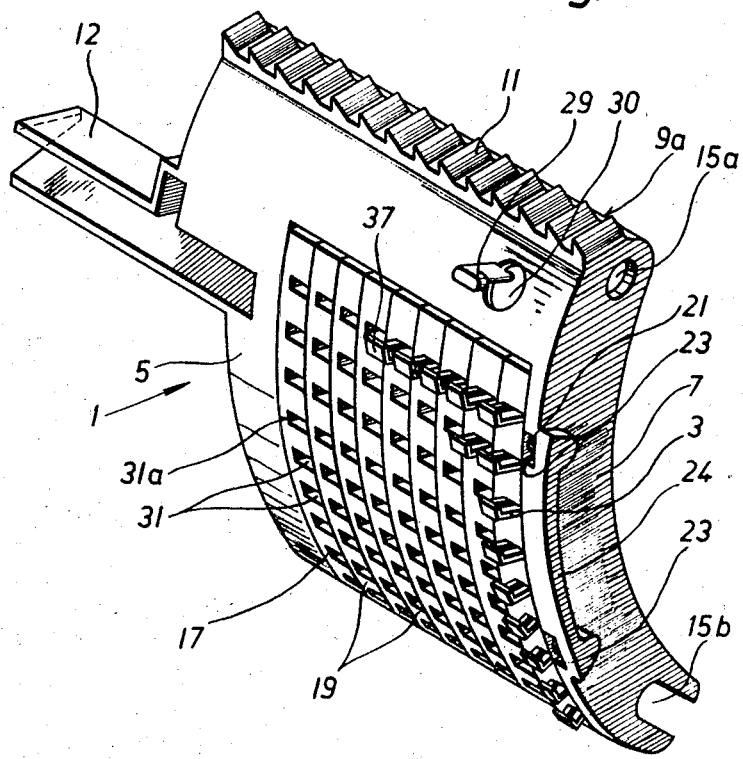
FIG. 4 is a perspective view illustrating the pin carriage shown in FIGS. 1 to 3.

Referring first to FIGS. 1 to 4, a frame body 1 comprises a front portion 5, lateral portions 7, longitudinal portions 9a and 9b, a rack portion 11 at the end of longitudinal portion 9a, and a zero abutment 12. Portions 5, 7, 9, 11 and 12 are made entirely of a synthetic plastic material and form an integral homogeneous body. The frame body 1 may be manufactured by injection molding process, and the construction is such that the lateral and longitudinal portions 7 and 9 constitute reinforcing and stiffening ribs for front portion 5.

Front portion 5 has a rectangular aperture 17 in which a plurality of elongated holding elements 19 is mounted. Holding elements 19 have openings 31 in the form of open recesses or cutouts which are closed by the respective adjacent holding element 19. A row of openings 31 is provided in each holding element 19, each row being associated with a denominational order. The rows in each ordinal holding element form the columns of a matrix, and corresponding openings are arranged in lines of the matrix, and are associated with the same digit. Nine openings are provided in each holding element 19, respectively corresponding to the digits zero to eight. For the digits nine, no openings are provided. A stop pin 3 is placed in each opening 31 shiftable between a normal position and an operative set position.

For the digits nine, no openings 31 and stop pins 3 are provided since the actuators are stopped in the position "nine" by an abutment 9' shown in dash and dot lines in FIG. 2 and being provided at the lower longitudinal portion 9b. This abutment may be omitted and replaced by a stop which is not a part of the pin carriage.

Lateral portions 7 have openings 15a and 15b for mounting the pin carriage on guide rails. The openings 15a are circular bores, and the openings 15b are open recesses.

In the illustrated embodiment, rack portion 11 forms an integral part of longitudinal portion 9a and is located on the outside of the same. However, the rack portion 11 may also be disposed in a position in which its teeth face forwardly, which permits the use of the outer edge of the upper longitudinal portion 9a for other purposes, for example, for an order indicator. An upwardly projecting boss may be cast or molded integral with the portion 9a and the indicator is detachably inserted into a corresponding opening of the same. It is, of course, also possible to make the rack bar part of the lower longitudinal portion 9b.

The zero abutment 12 is used for stopping the actuators of higher unused decimal orders, and is constructed as a V-shaped channel which laterally projects from one of the lateral portions 7. The V-shaped cutout of the zero abutment 12 reduces the weight of the pin carriage. The zero abutment 12 may be provided with an opening zero abutment 12 may be provided with an opening which is engaged by a clearing member when the pin carriage is to be returned to its original position.

In the embodiments of FIGS. 1 to 4, the front portion 5 is arcuate and convex to the outside, as required for use with actuators turning about a common axis for sensing stop pins set in the pin carriage. Frame body 1 has an integral projection 29 for holding a spring, not shown, which biases the pin carriage to move to the left as viewed in the drawing so that the pin carriage moves stepwise between ordinal positions after each actuation of a key. Projection 29 is cast or molded together and integral with the frame body 1. To facilitate this operation, an opening 30 is provided in the front portion 5 adjacent projection 29.

FIG. 2 shows one of the lamellae-like holding elements 19 in section. Holding elements 19 have the same arcuate and convex shape as front portions 5.

Holding elements 19 are located in a rectangular aperture of front portion 5. Each holding element 19 has projecting connector pins 21 which are located in corresponding sockets or recesses 22 of the respective adjacent holding element 19. The holding elements 19 are attached to each other by the connecting means 21, 22 and inserted as a unit into the aperture of the front portion 5. The connector pins 21 of the last holding element 19 on the right of FIG. 1 are placed in recesses 23 in front portion 5 which are open toward the front. A boss 24 is preferably provided to reinforce the respective lateral portion 7 which is weakened by recesses 24.

The lower ends of the holding elements have prongs forming a recess 25 matching a projection 26 on the lower longitudinal portion 9b of the frame body. The upper end portions of the holding elements 19 also have prongs forming a recess 27 matching a projection 28 of the upper edge of front portion 5 bounding the rectangular aperture.

The rear prongs 27a are resilient and snap behind projection 28 when the unit consisting of all holding elements is inserted into the rectangular aperture of the front portion 5. In this manner, the holding elements 19 are detachably attached to the integral frame body 1, and can be easily removed, if desired.

Each holding element 19 has nine recesses or cutouts 31 for receiving stop pins 3 associated with the digits zero to eight. The recesses 31 and stop pins 3 are denominational so that a surface of the respective adjacent holding element 19 closes the respective recesses and forms rectangular opening for the insertion of the stop pins. In this manner, each holding element has a web, and portions transversely projecting from the web and defining between each other the recesses 31. The webs are hollow and have cavities 32, as best seen in FIG. 2, so that the weight of the pin carriage is reduced.

As shown in FIG. 3, the bottom surfaces of the recesses 31, which are surface portions of the web, have two notches 33 and 34 cooperating with an arresting projection 35 provided on each stop pin 3. Projection 35 and notches 33, 34 constitute arresting means for arresting stop pins 3 in inoperative and operative set positions, respectively.

Stop pins 3 are also made of the same synthetic plastic material as the frame body 1 and the holding elements 19, and have open slots 36 which render the arresting projection 35 resilient for cooperation with notches 33 and 34.

It is possible to reverse the arrangement, and to provide the notches 33 and 34 in stop pins 3, and an arresting projection 35 in recesses 31. Each stop pin 3 has a head portion 37 facing toward the keyboard of the calculator and cooperating with setting members which are actuated by the keys.

A particular advantage of the holding elements 19 is that any desired number of holding elements 19, corresponding to the number of desired decimal orders can be combined in a unit and mounted in a corresponding frame body. In other words, different frame bodies may be used for different calculators together with different numbers of identical holding elements 19, each of which is associated with a decimal order.

Figure 5:
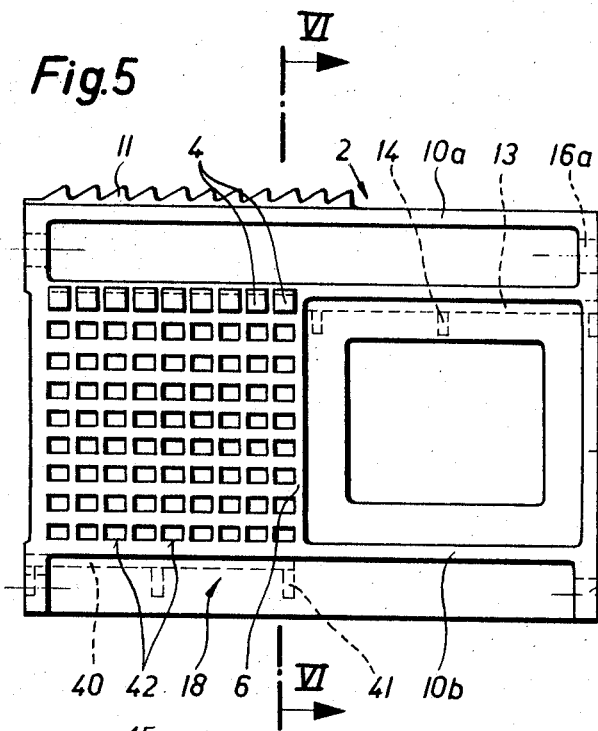
FIG. 5 is a front view illustrating another embodiment of the invention.
Figure 6:
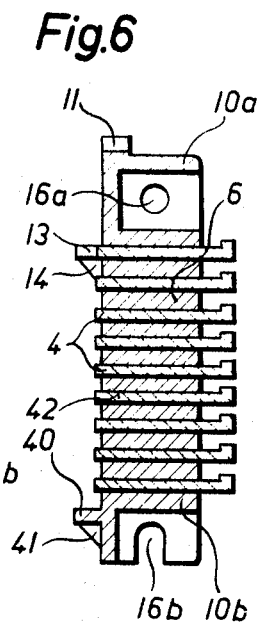
FIG. 6 is a sectional view taken on line VI—VI in FIG. 5.

FIG. 5 illustrates another embodiment of the invention which is designed for cooperation with actuators moving along a straight path for sensing stop pins set in the pin carriage.

An integral frame body 2 has planar front portion 6 formed as a plate having lateral portions 8 and longitudinal portions 10a, 10b which constitute stiffening ribs for frame body 2. The rack bar 11 forms part of the upper longitudinal portion 10a. The zero abutment 13 is constructed as a projecting abutment rearwardly projecting from the frame body 2 and reinforced by supporting brackets 14.

Lateral portions 8 have openings 16a and 16b for slidingly receiving rails on which the pin carriage moves.

The embodiment illustrated in FIGS. 5 to 8 has a "nine" abutment 40 arranged below the plate portion 18 which is constructed as a matrix composed of ordinal columns and digital lines of openings into which the stop pins are inserted. Plate 6, lateral and longitudinal portions 8 and 10, rack 11, zero abutment 13, and "nine" abutment 40 all form an integral homogeneous body made of a synthetic plastic material.

Figure 7:
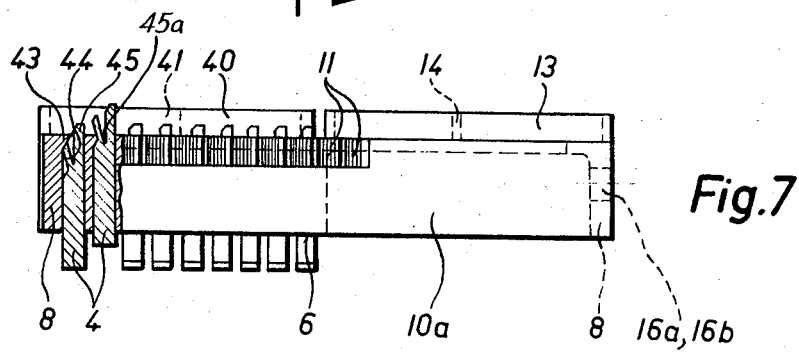
FIG. 7 is a plan view of the embodiment of FIG. 5, partially shown in section.

The openings 42 in plate 6 have a projection 43 near the rear end as best seen in section of FIG. 7.

Stop pins 4 have reduced end portions 45 which project from plate 6 for engaging the sensing actuators, not shown. A resilient tongue 44 projects from the throat 45a formed by the reduced portion 45 obliquely to the same and cooperates resiliently with projection 43 of opening 42. Projection 43 and resilient tongue 44 form resilient arresting means for arresting stop pins 4 either in a normal inoperative position, or in an operative set position.

Notches and an arresting projection as described with reference to FIGS. 1 to 4, may also be provided for this purpose. As in the embodiment of FIGS. 1 to 4, the stop pins used in the embodiment of FIGS. 5 to 8 are made of the same synthetic plastic material as the frame body.

It will be understood that each of the elements described above, or two or more together, may also find a useful application in other types of pin carriages differing from the types described above.

While the invention has been illustrated and described as embodied in a pin carriage consisting entirely of a synthetic plastic material, it is not intended to be limited to the details shown, since various modifications and structural changes may be made without departing in any way from the spirit of the present invention.

What is claimed as new and desired to be protected by Letters Patent is set forth in the appended claims.

1. A pin carriage for use with a calculating machine, comprising an integral frame body consisting of a synthetic plastic material and having a frame portion formed with a substantially rectangular opening bounded by a pair of first edges and by a pair of second lateral edges; a stack of parallel laterally abutting elongated ordinal holding elements consisting of a synthetic plastic material located in said aperture detachably attached to said first edges of said frame portion, each of said holding elements having a row of openings respectively correlated with digits, and lateral attaching means for detachably attaching a selected number of adjacent holding elements to each other to form said stack whereby stacks associated with different numbers of denominational orders can be assembled of said holding elements and mounted as a unit in a corresponding frame body; and a stop pin detachably mounted in each of said openings for movement between an inoperative and an operative position.

2. A pin carriage as defined in claim 1, wherein each of said openings has a wall with a projection; said stop pin in each opening having a lateral tongue at one end thereof cooperating with said projection to arrest said stop pin in said two positions thereof.

3. A pin carriage as defined in claim 2, wherein said one end of each stop pin has a lateral recess forming a thin end portion; and wherein said tongue obliquely projects from the throat of said lateral recess.

4. A pin carriage as claimed in claim 1, wherein said integral frame body comprises lateral and longitudinal portions bounding said frame portion; a rack portion; and a zero abutment.

5. A pin carriage as defined in claim 4, wherein said zero abutment is an abutment member laterally projecting from one of said lateral portions.

6. A pin carriage as defined in claim 4, wherein said frame portion is a planar plate.

7. A pin carriage as defined in claim 6, wherein said zero abutment is an elongated longitudnally extending abutment portion projecting rearwardly from said frame body and extending in longitudinal direction.

8. A pin carriage as defined in claim 1, wherein said frame portion is curved and convex to the outside.

9. A pin carriage as defined in claim 1, wherein said integral frame body has a projecting integral portion for attachment of a spring.

10. A pin carriage as defined in claim 1, wherein said attaching means comprise laterally projecting pins on one side of each holding element, and corresponding recesses on the other side of each holding element adapted to receive said laterally projecting pins of a respective adjacent holding element.

11. A pin carriage as defined in claim 10, wherein said frame portion has a lateral edge portion located adjacent the last holding element of said series and having recesses open towards the front for receiving said laterally projecting pins of said last holding element.

12. A pin carriage as defined in claim 1, wherein each of said holding elements has end portions having two prongs and a recess between said prongs for engaging corresponding projections of said first edges bounding said aperture.

13. A pin carriage as defined in claim 1, wherein each of said holding elements has laterally open cutouts closed by the respective adjacent holding element and constituting said openings.

14. A pin carriage as defined in claim 13, wherein each of said holding elements consists of a longitudinal web and laterally projecting portions forming between each other said laterally open cutouts; and wherein said webs have inner cavities to reduce the weight of said holding elements.

15. A pin carriage as defined in claim 1, wherein each stop pin consists of said synthetic plastic material and has an arresting projection; and wherein each of said openings is bounded by a surface having two notches for receiving said arresting projection in said inoperative and operative positions of an inserted stop pin.

16. A pin carriage as defined in claim 15, wherein each stop pin has a slot forming a resilient wall portion having said arresting projection so that the same snaps into one or the other of said two notches when the respective stop pin is actuated.

References Cited

UNITED STATES PATENTS

| 2,988,274 | 6/1961 | Carlsen et al. | 235—73 |
| 3,055,580 | 9/1962 | Tancred et al. | 235—60 |
| 3,076,602 | 2/1963 | Dombrowski | 235—137 |
| 3,095,143 | 6/1963 | Oldenburg et al. | 235—60 |
| 3,156,411 | 11/1964 | McEvoy | 235—60 |
| 3,161,353 | 12/1964 | Dombrowski | 235—60 |

STEPHEN J. TOMSKY, Primary Examiner